US011475453B2

(12) United States Patent
Wylie et al.

(10) Patent No.: US 11,475,453 B2
(45) Date of Patent: Oct. 18, 2022

(54) SYSTEM AND TECHNIQUES FOR UTILIZING A SMART CONTRACTS LIBRARY

(71) Applicant: Capital One Services, LLC, McLean, VA (US)

(72) Inventors: Stephen Wylie, Carrollton, TX (US); Qiaochu Tang, The Colony, TX (US)

(73) Assignee: Capital One Services, LLC

( * ) Notice: Subject to any disclaimer, the term of this patent is extended or adjusted under 35 U.S.C. 154(b) by 0 days.

(21) Appl. No.: 16/731,849

(22) Filed: Dec. 31, 2019

(65) Prior Publication Data

US 2021/0201318 A1 Jul. 1, 2021

(51) Int. Cl.
*G06Q 20/40* (2012.01)
*G06Q 40/02* (2012.01)
*H04L 9/06* (2006.01)

(52) U.S. Cl.
CPC ......... *G06Q 20/405* (2013.01); *G06Q 40/025* (2013.01); *H04L 9/0637* (2013.01); *H04L 9/0643* (2013.01)

(58) Field of Classification Search
None
See application file for complete search history.

(56) References Cited

U.S. PATENT DOCUMENTS

| | | | |
|---|---|---|---|
| 9,544,149 B2 | 1/2017 | Follis | |
| 9,635,000 B1 | 4/2017 | Muftic | |
| 9,990,504 B1 | 6/2018 | Chapman et al. | |
| 10,102,526 B1 | 10/2018 | Madisetti et al. | |
| 10,432,402 B1 | 10/2019 | Griffin et al. | |
| 10,637,665 B1 | 4/2020 | Sundaresan | |

(Continued)

FOREIGN PATENT DOCUMENTS

WO    WO-2020123464 A1 *  6/2020    ........... H04L 9/3239

OTHER PUBLICATIONS

Bernstein, J., "Smart Contract Integration in Professional Sports Management: The Imminence of Athlete Representation", DePaul University Journal of Sports Law, 14(5):87-105 (2018).

(Continued)

*Primary Examiner* — John W Hayes
*Assistant Examiner* — Ari Shahabi
(74) *Attorney, Agent, or Firm* — KDB

(57) ABSTRACT

Disclosed are techniques and an apparatus for accessing a smart contract library that may include a number of templates of different legal contracts implementable as a smart contract between respective parties. Each template may include a number of sections having different contractual terms and conditions and fillable fields for specific contract terms. Each respective section of the number of sections includes programming code operable to enforce conformance with specific section-related contractual terms and conditions of the respective section and with any specific contract terms input to a fillable field of the respective section. A first user address generated based on cryptographic keys may be associated with a contract-creating computing device in a private blockchain. The first user address may be associated with the first user in the private blockchain. A finalized smart contract may have a smart contract address generated from the first user address and a nonce value.

20 Claims, 9 Drawing Sheets

(56) References Cited

U.S. PATENT DOCUMENTS

| | | |
|---|---|---|
| 2001/0002485 A1 | 5/2001 | Bisbee et al. |
| 2006/0095388 A1 | 5/2006 | Brown et al. |
| 2016/0260171 A1 | 9/2016 | Ford et al. |
| 2016/0292672 A1 | 10/2016 | Fay et al. |
| 2017/0011460 A1 | 1/2017 | Molinari et al. |
| 2017/0046526 A1 | 2/2017 | Chan et al. |
| 2017/0046792 A1 | 2/2017 | Haldenby et al. |
| 2017/0177855 A1 | 6/2017 | Costa Faidella et al. |
| 2017/0206603 A1 | 7/2017 | Al-Masoud |
| 2017/0220815 A1 | 8/2017 | Ansari et al. |
| 2017/0220998 A1 | 8/2017 | Horn et al. |
| 2017/0257358 A1 | 9/2017 | Ebrahimi et al. |
| 2017/0272250 A1 | 9/2017 | Kaliski, Jr. |
| 2017/0295023 A1 | 10/2017 | Madhavan et al. |
| 2017/0344987 A1 | 11/2017 | Davis |
| 2018/0018723 A1 | 1/2018 | Nagla et al. |
| 2018/0048461 A1 | 2/2018 | Jutla et al. |
| 2018/0062848 A1 | 3/2018 | Gorman |
| 2018/0075247 A1 | 3/2018 | Campero et al. |
| 2018/0075527 A1 | 3/2018 | Nagla et al. |
| 2018/0083951 A1 | 3/2018 | Cicchitto et al. |
| 2018/0089758 A1 | 3/2018 | Stradling et al. |
| 2018/0101844 A1 | 4/2018 | Song et al. |
| 2018/0117446 A1 | 5/2018 | Tran et al. |
| 2018/0137512 A1 | 5/2018 | Georgiadis et al. |
| 2018/0139042 A1 | 5/2018 | Binning et al. |
| 2018/0144298 A1 | 5/2018 | Rankin |
| 2018/0152297 A1 | 5/2018 | Fielding et al. |
| 2018/0176017 A1 | 6/2018 | Rodriguez et al. |
| 2018/0183587 A1 | 6/2018 | Won et al. |
| 2018/0218456 A1 | 8/2018 | Kolb et al. |
| 2018/0227116 A1* | 8/2018 | Chapman ............... G06F 9/451 |
| 2018/0227293 A1 | 8/2018 | Uhr et al. |
| 2018/0278423 A1 | 9/2018 | Bianzino et al. |
| 2018/0288022 A1 | 10/2018 | Madisetti et al. |
| 2018/0322491 A1 | 11/2018 | Madisetti et al. |
| 2018/0330348 A1 | 11/2018 | Uhr et al. |
| 2019/0012249 A1 | 1/2019 | Mercur et al. |
| 2019/0018888 A1 | 1/2019 | Madisetti et al. |
| 2019/0019180 A1 | 1/2019 | Coburn et al. |
| 2019/0026847 A1* | 1/2019 | Stencil, Jr. ............. G06Q 50/18 |
| 2019/0034402 A1 | 1/2019 | Anderson et al. |
| 2019/0034602 A1 | 1/2019 | Votaw et al. |
| 2019/0036778 A1 | 1/2019 | Bathen et al. |
| 2019/0051390 A1 | 2/2019 | Shah |
| 2019/0057382 A1 | 2/2019 | Wright et al. |
| 2019/0095909 A1 | 3/2019 | Wright et al. |
| 2019/0103967 A1 | 4/2019 | Meng et al. |
| 2019/0130399 A1 | 5/2019 | Wright et al. |
| 2019/0164153 A1 | 5/2019 | Agrawal et al. |
| 2019/0220831 A1* | 7/2019 | Rangarajan ........... H04L 9/0869 |
| 2019/0325038 A1 | 10/2019 | Finlow-Bates |
| 2019/0370799 A1 | 12/2019 | Vivas et al. |
| 2019/0385172 A1 | 12/2019 | Jayaram et al. |
| 2019/0386833 A1 | 12/2019 | Alger et al. |
| 2020/0007316 A1 | 1/2020 | Krishnamacharya et al. |
| 2020/0042989 A1 | 2/2020 | Ramadoss et al. |
| 2020/0119905 A1 | 4/2020 | Revankar et al. |
| 2020/0143469 A1 | 5/2020 | Stewart et al. |
| 2020/0184556 A1 | 6/2020 | Cella |
| 2020/0279257 A1 | 9/2020 | Cheng et al. |
| 2020/0279328 A1 | 9/2020 | Zhiri et al. |
| 2020/0302433 A1 | 9/2020 | Green |
| 2020/0349561 A1 | 11/2020 | Kuchkovsky Jimenez et al. |
| 2020/0380624 A1 | 12/2020 | Turgman et al. |
| 2021/0042851 A1 | 2/2021 | Gupta et al. |
| 2021/0201318 A1 | 7/2021 | Wylie et al. |

OTHER PUBLICATIONS

Stark, J., "Making Sense of Blockchain Contracts", [online] Coindesk [retrieved on Feb. 15, 2019]. Retrieved from Internet URL: https://www.coindesk.com/making-sense-smart-contracts.

Alharby, M., et al., "Blockchain-based Smart Contracts: A Systemtatic Mapping Study", Computer Science & Information Technology (CS & IT), pp. 125-140 (2017).

Luu, L., et al., "Making Smart Contracts Smarter", paper presented at 23rd Annual ACM Conference (CCS'16) Oct. 24-28, 2016, Vienna, Austria, pp. 254-269.

Saini,V., "ContractPedia: An Encyclopedia of 40+ Smart Contract Platforms", retrieved from Internet URL:https://hackemoon.com/contractpedia-an-encyclopedia-of-40-smart-contract-platforms-4867f66da1e5, retrieved on Jun. 13, 2019.

Author Unknown, "Etherparty Update Nov. 2017", retrieved from Internet URL:https://blog.etherparty.com/etherparty-update-for-november-2017-fba4279f95a4, retrieved on Jun. 13, 2019.

Rosie, A., "Smart Contracts: The Blockchain Technology That Will Replace Lawyers", retrieved from Internet URL https://blockgeeks.com/guides/smart-contracts/, retrieved on Jun. 14, 2019.

Author Unknown, "Etherscan", retrieved from Internet URL:https://etherscan.io/address/0xa74476443119A942dE498590Fe1f2454d7D4aC0d#readContract, retrieved on Jun. 14, 2019.

Author Unknown, "Etherscan", retrieved from Internet URL:https://etherscan.io/address/0xa74476443119A942dE498590Fe1f2454d7D4aC0d#internaltx, retrieved on Jun. 14, 2019.

Zorov, V., "How are smart contracts stored on the Ethereum blockchain? Does a smart contract also have a public and a private key?", retrieved from Internet URL:https://www.quora.com/How-are-smart-contracts-stored-on-the-Ethereum-blockchain-Does-a-smart-contract-also-have-a-public-and-a-private-key, retrieved on Jun. 14, 2019.

* cited by examiner

200

| 210 | Access Smart Contract Library |

| 215 | Receive a selection of a template of a smart contract from a number of templates |

| 220 | Obtain a private cryptographic key |

| 225 | Generate a first user address associated with the contract-creating computing device in a private blockchain |

| 230 | Generate a smart contract address |

| 235 | Generate a smart contract hash value |

| 240 | Store the smart contract hash value as a transaction in the private blockchain |

| 245 | In response to completion of a section of the smart contract, generate a subsequent smart contract hash value as a subsequent transaction in the private blockchain |

| 250 | Report the subsequent transaction related to the smart contract is in the private blockchain |

310 Revise the selected section by inputting specific contract terms in a fillable field of the selected template selected to be revised

315 Receive the updated section

320 Replace the section of the smart contract with the updated section

325 Modify the programming code based on the revised terms and conditions for compliance confirmation

330 Generate a programming code hash by inputting the modified programming code into a programming code hash function

335 Assemble all sections of the selected template including the revised one or more sections of the selected template into a finalized smart contract

410 — Access A Smart Contract Library

415 — Receive a selection of a template of a smart contract from a number of smart contract templates in the smart contract library

420 — Assemble all sections of the selected template into a finalized smart contract

425 — Obtain an assigned private cryptographic key

430 — Generate a first user address in a private blockchain

435 — Receive an indication of execution of a portion of the finalized smart contract

440 — Generate a smart contract address

445 — Store the smart contract hash value as a transaction in the private blockchain

450 — In response to completion of a section of the smart contract, generate a subsequent smart contract hash value as a subsequent transaction in the private blockchain

455 — Report the subsequent transaction related to the smart contract is in the private blockchain

FIG. 4

SYSTEM AND TECHNIQUES FOR UTILIZING A SMART CONTRACTS LIBRARY

BACKGROUND

Templates for legal contractual documents for word processing software have been available for some time. However, the legal contractual document templates typically have no affiliation with an enterprise or a consumer party or user that is party to the contract. As a result, the templates may not have language that provides a level of protection desired either by the enterprise party or user party.

In addition, these templates may not provide notifications of changes to terms and conditions or actions taken by the parties with respect to the changed terms. The terms may also not be evaluated against applicable laws related to contracts, such as usury or the like.

Moreover, the agreed upon changes to the terms and conditions may not be immutable because the configuration management of the contractual document may be lacking. As a result, the revision cycle may require a number of re-iterations between parties before arriving at a contract with acceptable terms and conditions for all parties.

SUMMARY

Disclosed is an example of a method that includes a step of accessing, by a contract-creating computing device, a smart contract library. The smart contract library may include a number of templates of different legal contracts implementable as a smart contract between respective parties in the smart contract. Each template of the number of templates includes a number of sections having different contractual terms and conditions and fillable fields for specific contract terms. Each respective section of the number of sections includes programming code operable to enforce conformance with specific section-related contractual terms and conditions of the respective section and with any specific contract terms input to a fillable field of the respective section. A selection of a template of a smart contract may be received from the plurality of templates for implementation as a finalized smart contract. A private cryptographic key assigned to a first user of the contract-creating computing device may be obtained. The private cryptographic key may be associated with a public cryptographic key. A first user address associated with the contract-creating computing device in a private blockchain may be generated. The first user address may be based on the private cryptographic key and may be associated with the first user in the private blockchain. A smart contract address may be generated for the finalized smart contract using the first user address and a nonce value. A smart contract hash value may be generated using a value related to the programming code of the smart contract as an input into a hash function. The smart contract hash value may be stored as a transaction in the private blockchain. The transaction may be associated with the smart contract hash value and the first user address in the private blockchain.

An apparatus is disclosed that includes a processor and a memory. The processor may be operable to execute programming code. The memory may be coupled to the processor and be operable to store information and the programming code executable by the processor. The memory may include a secure element operable to store a first user address in a private blockchain and a private cryptographic key or a public cryptographic key. The processor may be operable upon execution of the programming code stored in the memory to perform functions. A smart contract library may be accessed that includes a number of templates of different legal contracts implementable as a smart contract between respective parties in the smart contract. Each template of the number of templates includes a number of sections having different contractual terms and conditions. Each respective section of the number of sections includes programming code operable to enforce conformance with specific section-related contractual terms and conditions of the respective section. A selection of a template of a smart contract from the number of templates may be received for implementation as a smart contract. An indication of execution of a portion of the smart contract may be received. The executed portion may indicate acceptance of the terms and conditions in the plurality of sections of the selected template. A smart contract address in the private blockchain may be generated using the first user address and a nonce value. A smart contract hash value may be generated using a value related to the programming code of the smart contract as an input into a hash function. The smart contract hash value may be stored as a transaction in the private blockchain. The transaction may be associated with the smart contract address and the first user address in the private blockchain.

An example of non-transitory computer-readable storage medium storing computer-readable program code executable by a processor is also disclosed. A smart contract library may be accessed that includes a number of templates of different legal contracts implementable as a smart contract between respective parties in the smart contract. Each template of the plurality of templates may include a number of sections having different contractual terms and conditions and fillable fields for specific contract terms. Each respective section of the number of sections may include programming code operable to enforce conformance with the different contractual terms and conditions including any specific contract terms. receive a selection of a template of a smart contract from the plurality of templates for implementation as a smart contract. All sections of the selected template may be assembled into a finalized smart contract. An assigned private cryptographic key may be obtained, and the private cryptographic key may be associated with a public key. A first user address may be generated in a private blockchain based on the assigned private cryptographic key. The assigned private cryptographic key may be associated with a public key. An indication of execution of a portion of the finalized smart contract may be received. The executed portion may indicate acceptance of the terms and conditions including the specific contract terms. A smart contract address may be generated using the assigned private cryptographic key and another value as an input into a hash function. The generated smart contract address may be based on an output of the hash function. The smart contract address may be stored as a transaction in a private blockchain, wherein the transaction is associated with the first user address and the smart contract address in a private blockchain.

BRIEF DESCRIPTION OF THE DRAWINGS

FIG. 2 illustrates a flow chart of an example of a process for initiating and implementing a smart contract.

FIG. 3 illustrates a flow chart of an example of a smart contract revision subprocess.

FIG. 4 illustrates another example of a process for initiating and implementing a smart contract.

DETAILED DESCRIPTION

Figure 1:
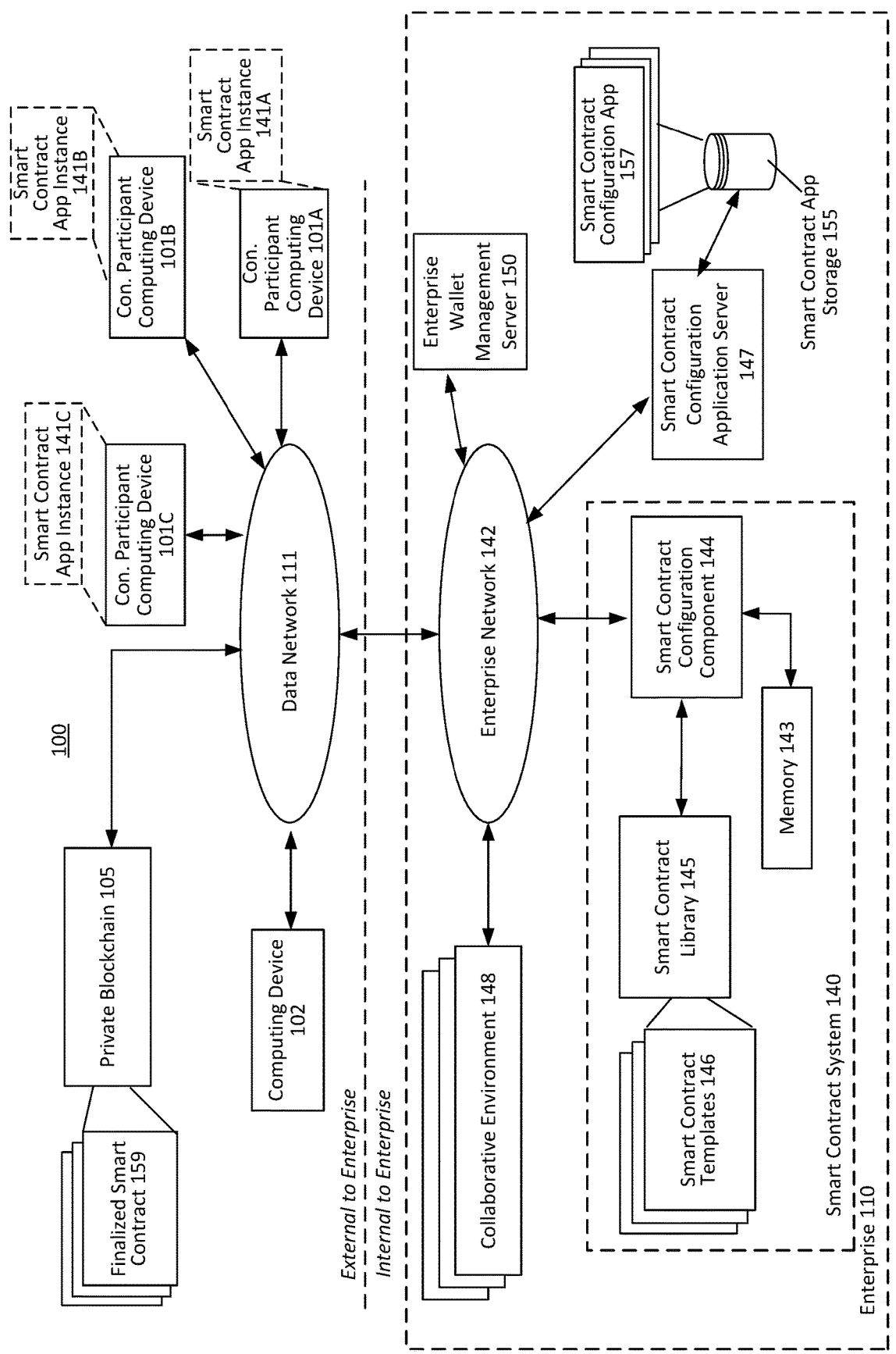
FIG. 1 shows an example of a system suitable for implementing examples of uses of smart contracts and the building of a smart contract that utilize a blockchain.

FIG. 1 shows an example of a system implementation suitable for implementing examples of a process that utilizes a blockchain. The networking environment 100 may include multiple different systems that are internal to an enterprise 110 and external to the enterprise 110. For example, systems and components internal to the enterprise 110 may include an enterprise network 142, an identity and smart contract system 140, a smart contract server 147, an enterprise wallet management server 150, and a collaborative environment 148. The networking environment 100 may also include elements external to the enterprise 110 that, however, are coupled to the enterprise 110. For example, external elements such as a data network 111, computing devices 101A, 101B and 101C, blockchain 105, computing device 102, and the like. The data network 111 may be a data network, such as the internet, another type of data network (e.g., a wide area network, campus wide network, metropolitan area network, or the like), a cellular network, or the like, external to the enterprise 110. The data network 111 may be coupled to several computing devices, such as computing devices 101A, 101B and 101C as well as blockchain 105 and computing device 102. The data network 111 may exchange communicates with the enterprise network 142 utilizing known security protocols.

The smart contract system 140 may comprise systems with access to blockchain 105 via the enterprise network 142 and data network 111.

In more detail, the smart contract system 140 may include a memory 143, a smart contract library 145 and a smart contract configuration component 144. The memory 143 may store programming code for executing processes and functions, such as an example of a process described in more detail with FIG. 4 below. The smart contract library 145 may store a number of smart contract templates including a smart contract 146. In an example, the smart contract library 145 may include smart contract templates having different classes of contract templates. For example, the different classes of contract templates may include automobile loans for different terms, automobile leasing agreements, apartment leasing agreements, wills, trusts, child custody arrangements, bankruptcy documents, equipment leasing agreements, documents requiring any one of notarization, authentication or auditability, or the like. Each smart contract template, such as smart contract 146, in the smart contract library 145 may have contract terms and conditions, and programming code. The programming code may be executed by a computing device, such as computing devices 101A-C. The smart contract server 147 may be coupled to the enterprise network 142 with a connection to the data network 111 and the smart contract system 140. The smart contract system 140 may include a smart contract configuration component 144, the smart contract library 145, and the memory 143.

The networking environment 100 can generate a non-reputable record of interactions via the blockchain 105. Furthermore, the blockchain 105 can be distributed across a plurality of computing systems, encouraging trust in the validity of the records stored in the blockchain 105. In this manner, the disclosed systems provide an innovative technical solution to at least the above-mentioned technical problems with conventional systems.

A computing device, such as 101A-C may be operable to receive a request for selection of a smart contract from the smart contract library 145, provide information to the identity and smart contract system 140, and perform other functions. In some embodiments, computing device, such as 101A-C may be operable to receive the request from another element of the networking environment 100, such as another computing device, such as 101A-C and/or a computing device 102. A computing device, such as 101A-C, may be operable to interact with blockchain 105 to process the request by storing a transaction or retrieving information in a transaction from the blockchain 105.

For example, a computing device, such as 101A-C, may also be operable to store transactions in blockchain 105, consistent with examples disclosed herein. As described with reference to the examples of FIGS. 2-6, the transactions may include smart contracts hash values or the like.

Private blockchain 105 may comprise a distributed ledger data structure, consistent with disclosed examples. For example, authorized systems, such as enterprise wallet management server 150 or smart contract server 147, may store copies of blockchain 105. These authorized systems may be operable to add blocks to blockchain 105, validate the contents of blocks produced by other systems, publish the blocks to other authorized systems, and/or manage read/write permissions for other systems to blockchain 105. Authorized systems may be operable to receive transactions from other systems for publication in private blockchain 105. Other systems may have read-only access to private blockchain 105. As described below, private blockchain 105 may be operable to store information as well as transactions from member systems as transactions to the private blockchain 105, where the information or transactions in a transaction may include one or more of: a user's uploaded identifying documents (possibly encrypted), and/or a hash of content of the smart contract; an ownership document endorsement token (ODET) left by one or more trusted independent systems' servers; e-signatures on the smart contract; or metadata including, for example, who is supposed to sign the smart contract and when the smart contract expires (e.g., how long the offer in the smart contract is open or an event that results in expiration).

Enterprise network 142 may be operable to provide communications between components internal to the enterprise of FIG. 1 and communicate with networks and devices external to the enterprise, such as data network 111, computing devices 101A-C and 102, and private blockchain 105. For example, network 142 may be any type of network (including infrastructure) that provides communications, exchanges information, and/or facilitates the exchange of information, such as a Local Area Network, a Wide Area Network, or other suitable connection(s) that enables identity and smart contract system 140 to send and receive information between the components of the enterprise.

In some examples, the smart contract may have sufficient programming code to perform the auditing functions. In an operational example, the smart contract server 147 may be operable to execute programming code, such as the programming code stored in the memory 143 to perform functions and provide services to the enterprise or enterprise customers. The smart contract server 147 may distribute instances of the smart contract configuration application 157 to computing devices that request the smart contract configuration application. The smart contract configuration application 157 may be a decentralized application downloaded to a mobile device or computing device to generate a smart contract. The smart contract configuration application 157 may, for example, include programming code that enables generation of a unique address for the smart contract. The form of the unique address may be dependent upon the type of blockchain (e.g., Ethereum or Hyperledger) that is being used by the user. For example, the private blockchain 105 may mimic the attributes of either Ethereum or Hyperledger and the unique address generated by the smart contract configuration application 157 may be a digital address associated with information related to the smart contract. A digital address may, for example, be a unique alphanumeric codename (e.g., 1CK6KY6MHgYvmRQ4PAaf-KDrglejbHcE, 1234Z5OX, or the like) for the smart contract. Similar unique alphanumeric codes may be used in the generation of an address for a user, a digital wallet or another smart contract in a blockchain.

The smart contract server 147 may, for example, be operable to access a smart contract application storage 155 and provide a copy (or instance) of the smart contract configuration computer application 157 to a first user's computing device, such as computing device 101A, in response to a request from the first user's computing device 101A. The request of the copy or instance of the smart contract configuration computer application code may be received via a connection (e.g., through a communication interface—not shown in this example) to the external data network 111 to the enterprise network 142. Upon receipt of the smart contract configuration computer application code, the code may be installed as an instance of smart contract configuration computer application (i.e., a smart contract configuration application (App) instance) 141A. Similar requests may be made by computing devices 101B and 101C, which may install instances of the smart contract configuration computer application code as a smart contract configuration app instance 141B and a smart contract configuration app instance 141C.

When a respective instance of a smart contract configuration application, such as 141A, 141B or 141C is installed on a respective one of computing devices 101A-C, the respective instance of the smart contract configuration app may communicate via the data network 111 and enterprise network 142 with the smart contract system 140. For example, the smart contract configuration component 144 may receive from the instance of the smart contract configuration application instance, such as 141A executing on the first user's computing device 101A, a selection of a smart contract from the smart contract library 145. In some examples, the selected smart contract, such as 146, may include sections. Each section may be modifiable and may have a set of contract attributes and settings for the respective section. Contract attributes of a smart contract may include the number of signers, required signers, signature pages, contract term, an expiration date or period, collateral, terms of default and repossession, annual percentage rate or monthly payment on an amount of money owed, or the like, and the settings may include action to take upon expiration or completed execution, or failure of one party to execute the contract, where a copy of the final terms and conditions of the smart contract may be stored, a hash function or type of hash function to be applied to a final smart contract, electronic signatures, an address where transactions are to be stored, or the like.

Each section of the smart contract 146 may also include programming code that may be operable to evaluate the terms and settings of the particular section with respect to other actions related to the smart contract for compliance. In addition, the programming code may be operable to take actions in response to the evaluation indicating compliance or non-compliance. For example, the programming code may generate a message to the parties indicating fulfillment of a term of a particular section and trigger actions, such as money transfers, title amendments, notes of satisfaction, or the like. For example, in the context of a vehicle loan, the smart contract programming code may be operable to be taken such as a transfer of title to a vehicle from a lien holder to the owner of a vehicle when a final payment is made to the lien holder, or the like.

The example of FIG. 2 illustrates an example of a process 200 for creating a smart contract. A data storage may be provided that contains a smart contract library template identified by the received indication may be accessed. In the example process 200, a contract-creating computing device may access a smart contract library (210). The smart contract library may, for example, include a number of templates of different legal contracts in which each of the templates is implementable as a smart contract between respective parties in the smart contract. In addition, each template of the plurality of templates may include a number of sections having different contractual terms and conditions and fillable fields for specific contract terms. Also, each respective section of the number of sections may include programming code operable to enforce conformance with specific section-related contractual terms and conditions of the respective section and with any specific contract terms input to a fillable field of the respective section. At 215, the contract-creating computing device may receive a selection of a template of a smart contract from the plurality of templates in the smart contract library for implementation as a finalized smart contract. The process of selecting the template of a smart contract may include additional steps. For example, the selection of a template may be an indication that the selected template is related to one of: an automobile purchase, an automobile lease, a personal loan, a business loan, a rental agreement, a will, a trust agreement, an insurance agreement, or the like may be received. The selected template may include programming code suitable for implementing the smart contract based on the selected template.

At 220, a private cryptographic key may be obtained. The private cryptographic key may be assigned to a first user of the contract-creating computing device. The private cryptographic key is associated with a public cryptographic key. A first user address associated with the contract-creating computing device in a private blockchain may be generated (225). The first user address is based on the private cryptographic key and is associated with the first user in the private blockchain. A smart contract address may be generated, at 230, for the finalized smart contract using the first user address and a nonce value. As an authentication measure and to preserve a version of the smart contract, a smart contract hash value may be generated (235). For example, a smart contract hash value may be generated using a value related to the programming code of the smart contract as an input into a hash function.

The smart contract hash value may be a hash of the finalized smart contract. The hash of the finalized smart contract may include as inputs: the text of the finalized smart contract (e.g., all sections of the smart contract including all of the revised text and/or all of the programming code of each section of the finalized contract), the programming code of the sections of the smart contract, a hash value of the programming code of the sections of the smart contract, an identifier associated with the contract-creator computing device, identifiers of the parties to the smart contract, or the like.

At 240, the smart contract hash value may be stored as a transaction in the private blockchain. In an example, the transaction may be associated with the smart contract hash value and the first user address in the private blockchain.

At 245, in response to completion of a section of the smart contract, a subsequent smart contract hash value may be generated as a subsequent transaction in the private blockchain. For example, programming code of a particular section of the smart contract may receive indications from each respective party to the smart contract regarding a term or condition of the particular section of the smart contract. In a specific example, the particular section may require a transfer and receipt of funds to satisfy the respective terms or conditions of the particular section of the smart contract. Upon the transfer and receipt of the funds, the funds transferring party, the fund recipient party, or the financial institution executing the transfer may provide inputs (e.g., hash values of amount of funds, bank account numbers, routing numbers or the like) to a subsequent transaction in the private blockchain. The subsequent transaction may be associated with the smart contract address, an address of each party of the smart contract, or the like.

In an example of the execution of programming code in the smart contract, the programming code of the smart contract may contain functions that the user can invoke by calling them directly, or, may be invoked in response to an event, such as by making a deposit of cryptocurrency into the smart contract.

In some examples, any response time periods (e.g., payment grace periods, period for acceptance or the like) may be managed by initiating a call to a function by an external source, such as scheduler program or the like. For example, a function such as determining if your loan has gone into delinquency may need to be called by a scheduler that may reside on wallet management server 150 or the like that keeps track of given periods outlined in the smart contracts. Such an example may occur because a user may not make any further payments on a loan, and logic residing in the payment function to check the payment relative to the date may not ever run again. However, this example payment function may be run any time an entity related to the smart contract wishes to call any of the smart contract's functions. For example, a loan smart contract may include a method for making a payment, checking an amount paid, and checking remaining balance. The payment method may, for example, accept payments from one wallet per loan, or from any wallet for just one loan. The former way may reduce costs for the financial institution in servicing loans on the cryptocurrency network (particularly Ethereum), but it may also limit the payor to only make payments from one wallet. The latter way would be akin to making payments on a single loan from multiple bank accounts. The payment method may either contain, or call upon completion, a piece of code that checks for satisfaction of the loan terms—i.e., the loan has been fully paid off by the due date. If this condition has been met, some action may be initiated, for instance, a digital title transfer, or the like. In a further example, a system may be implemented where interaction between two parties needs to take place. For instance, one party may use a smart contract to facilitate document upload. Once the documents have been uploaded through a smart contract function call, a hash of the document and its path may be stored in the smart contract, and this function may alert a second party to review the submitted documents. Upon satisfactory review by the second party, the smart contract may take another action such as notifying the first party, and/or allowing access to additional smart contract templates (such as open an account, get a loan, or the like).

Returning to the example of FIG. 2, in response to the subsequent transaction being authenticated as complying with the respective section of the smart contract by the programming code of the respective section, programming code of a section of the smart contract may report that the subsequent transaction is in the private blockchain (250). The report may be sent to an entity associated with the smart contract library for further distribution to the parties of the smart contract. Alternatively, the report may be sent directly to the parties of the smart contract.

The process 200 may include additional processes. For example, in an additional process, one or more sections of a number of sections of the selected template may be revised. To facilitate revisions, functions may be accessible by administrators where, if a message is sent with the right credentials or a transaction is made from the correct originating wallet, then a loan's monthly due date or balance may be modified during the loan's term. Once a smart contract is initiated, a variable in the smart contract that stores an address of a smart contract and a function that can update the variable may be used to actually change one or more sections of the smart contract. If the address is different than the current smart contract's address, the context of execution can jump to the new address in order to run the updated code.

This additional process is shown in FIG. 3 and may be performed, for example, after the selection of a template of a smart contract is received by the contract creating device. FIG. 3 illustrates a flow chart of an example of a smart contract revision subprocess. In this example, the selected smart contract may include one or more sections that include terms and conditions that may be revised. In the example, process 300 may be a subprocess to process 200. The process 300 may enable one or more sections of the selected smart contract to be revised by inputting specific contract terms in the fillable field of the one or more sections of the selected template that has been selected to be revised (310).

In the example, the contract-creating computing device may, prior to assembling all sections of the selected template, receive an updated section of the one or more sections from the contract-creating computing device (315) based on the revision to the inputted specific contract terms in the fillable field of the updated section or a specific section-related contractual terms. An identical section of the selected template may be replaced with the updated section for assembling (320).

Some or all of the section of the number of sections of the selected template may include programmable code that implements a compliance scheme to ensure different terms or conditions related to the finalized smart contract are fulfilled. In the example, the programming code of the revised section of the selected template may be modified based on the received revision to the selected section or template (325).

In one or more examples, the programming code of the smart contract may be operable to track revisions to the selected template of the smart contract. Upon completion of the revisions to the selected template, a programming code hash value may be generated by inputting the modified programming code into a programming code hash function (330). In the example, all sections of the selected template including the revised one or more sections of the selected template may be assembled into a finalized smart contract (335).

Other subprocesses may also be implemented. For example, in addition to storing the smart contract hash value as a transaction in the private block chain, the programming code hash value may also be stored as part of a revision-related transaction to the private blockchain. For the example, the revision-related transaction may be associated with the smart contract address, a contract participating device address, and/or a contract creator-address in the private blockchain. The revision-related transaction that stores the programming code hash value as the revision-related transaction may be an initial transaction stored in the private blockchain prior to storing the smart contract hash value.

The process 300 may further include sending a message related to the finalized smart contract for delivery to a contract participating device. For example, the contract participating device may be different from the contract-creating computing device. In the example, the contract participating device may be a computing device (e.g., a tablet, a desktop computer, a smart phone, a laptop, or the like) having a computing device identifier. The computing device identifier may be associated with the smart contract. In the example, a contract participating hash value indicating a further portion of the smart was executed the party associated with the contract participating device may be received from the contract participating device. The contract participating hash value may be stored as a subsequent transaction in the private blockchain. The subsequent transaction may be associated with the contract participating hash value, a smart contract address in the private blockchain, and the first user address in the private blockchain. In addition, authentication information may be received from the contract participating device via a short-range wireless communication link. The contract participating device may be authenticated based on the received authentication information. Based on the authentication, access may be provided to a secure collaborative environment within a network environment to the contract participating device. The secure collaborative environment may enable contract participating devices, such as the contract creating device and devices of the parties to the smart contract, to negotiate and modify terms and conditions of the smart contract. For example, while the contract participating devices are operating within the collaborative environment, the respective contract participating devices may receive a notification of a revision to the one or more sections of the smart contract by one or more of the respective contract participating devices within the collaborative environment.

In another example of generating a smart contract, FIG. 4 provides another process example for generating a smart contract. The process 400 example of FIG. 4 may be provided by a non-transitory computer readable medium embodied with programming code that when executed by a processor causes the processor to perform functions. For example, in the process 400, the processor may, at 410, access a smart contract library. The smart contract library may include a number of templates of different legal contracts implementable as a smart contract between respective parties in the smart contract. In an example, each template of the number of templates may include a number of sections having different contractual terms and conditions and fillable fields for specific contract terms, and each respective section of the number of sections may include programming code operable to enforce conformance with the different contractual terms and conditions including any specific contract terms input into the fillable fields provided by an instance of the smart contract application, such as 141C. At 415, the processor may receive a selection of a template of a smart contract from the number of templates for implementation as a smart contract.

All sections of the selected template may be assembled into a finalized smart contract by an instance of the smart contract application (420). In the example, one or more sections of a number of sections of the selected template may be revised. For example, specific contract terms may be input in a fillable field of the one or more sections of the selected template. For example, terms and conditions may be input into the fillable fields. In an automobile finance contract example, a loan term (i.e., duration of the loan), an annual percentage rate (APR), an amount to finance, a payment amount, a payment due date, a default conditions, early payment conditions, or the like.

All sections of the selected template including the revised one or more sections of the selected template may be assembled into a finalized smart contract. The smart contract application may, for example, forward the assembled and finalized smart contract to the smart contract configuration server 144 for validation. For example, the smart contract configuration server 144 may be operable to initiate a review process to ensure the contractual terms of the smart contract are valid.

An assigned private cryptographic key that is associated with a public key may be obtained (425). In the example, the smart contract application may initiate an encryption process as described with reference to other examples herein.

In addition, a first user address in a private blockchain may be generated based on the assigned private cryptographic key that may be associated with a public key (430).

As the parties begin to take actions to finalize the terms and conditions of the smart contract, a portion of the finalized smart contract may be executed. An indication of execution of a portion of the finalized smart contract may be received (435). The execution of the portion of the finalized smart contract may indicate acceptance of the terms and conditions including the specific contract terms. In the example, a smart contract address may be generated (at 440) based on an output of a hash function which uses the assigned private cryptographic key and another value as an input into the hash function. In the example, a smart contract address in the private blockchain may be generated using the first user address and a nonce value. The smart contract address may be stored (445) as a transaction in a private blockchain. For example, the transaction may be associated with the first user address and the smart contract address in a private blockchain.

The completion of respective sections of the smart contract may be monitored by one or more processes. For example, the smart contract may be set as a state machine, where there are variables keeping track of progress. For instance, if one is trying to enter into a home loan contract, there are several stages involved here, including: finding a home, getting prequalified, signing contract with a seller, loan origination/providing identity and income verification, title company paperwork, and loan company servicing. The smart contract may be operable to monitor a user's progress through all of the above stages. There may be programming code that implements stipulations in each section of the contract related to the above stages, and the implemented stipulations may look for signatures to be provided, or assets to be transferred into a digital wallet belonging to the smart contract. In addition, different functions may be called in order to perform an action on the smart contract. For example, one or more of the functions may pertain to one specific step but may be operable to ensure that all the steps before the specific step have been successfully fulfilled and that any related subsequent steps or future steps have not been completed already (unless the smart contract allows steps to be performed out of order or the like). For example, each time a function is called, the function may be operable to validate a status of a respective section of the smart contract (and possibly other sections). In response to the respective section being successfully completed, other functions related to this particular section and previous sections may be blocked from executing again if so desired by the users. For example, a master controller may also run functions periodically on the smart contract in order to enact mechanisms that should happen monthly or on some periodic basis (e.g., notification of an upcoming payment due date, or the like).

In the example of FIG. 4, at 450, in response to completion of a section of the smart contract, a subsequent smart contract hash value may be generated as a subsequent transaction in the private blockchain. The subsequent smart contract hash value may be generated, for example, using a value related to the programming code of the smart contract as an input into a hash function. For example, programming code of a particular section of the smart contract may receive indications from each respective party to the smart contract regarding a term or condition of the particular section of the smart contract. In a specific example, the particular section may require a transfer and receipt of funds to satisfy the respective terms or conditions of the particular section of the smart contract. Upon the transfer and receipt of the funds, the funds transferring party, the fund recipient party, or the financial institution executing the transfer may provide inputs (e.g., hash values of amount of funds, bank account numbers, routing numbers or the like) to a subsequent transaction in the private blockchain. The subsequent transaction may be associated with the smart contract address, an address of each party of the smart contract, or the like.

In response to the subsequent transaction being authenticated as complying with the respective section of the smart contract by the programming code of the respective section, programming code of a section of the smart contract may report that the subsequent transaction is in the private blockchain (455). The report may be sent to an entity associated with the smart contract library for further distribution to the parties of the smart contract. Alternatively, the report may be sent directly to the parties of the smart contract.

In the example, prior to step 420, an instance of the smart contract application executing on the processor of a computing device may receive a revision to the selected template of the smart contract. For example, the programming code of the selected template may be modified based on the received revision to the selected template. In addition, revisions to the selected template of the smart contract may tracked, and upon tracking no further revisions of the selected template, a programming code hash value may be generated to memorialize a version of the programming code of the smart contract by inputting the modified programming code into a programming code hash function. The programming code hash value may be stored as part of a revision-related transaction to the private blockchain. In the example, the revision-related transaction may be associated with the smart contract address, a contract participating device address, and the first user address in the private blockchain.

In another example, the instance of the smart contract application executing on the processor may receive authentication information in a communication from a contract participating device via a short-range wireless communication link of the computing device. The instance of the smart contract application executing on the processor may authenticate the contract participating device based on the authentication information in the received communication. The instance of the smart contract application executing on the processor, in response to the authentication of the contract participating device, may provide access to a secure collaborative environment, such as 148 of FIG. 1, within an enterprise, such as 110, to contract participating device.

In a further example, the instance of the smart contract application executing on the processor may forward a partially-revised version of the selected template to an instance of the smart contract application executing on a contract participating device different from the instance of the smart contract application executing on the processor. In the example, the instance of the smart contract application executing on the contract participating device may approve of a revision, and in response to the approval, an approved-revised version of the selected template may be assembly into the finalized smart contract may be receive from the contract participating device.

The instance of the smart contract application executing on the processor, in a further example, may receive an indication that the selected template is related one of: an automobile purchase, an automobile lease, a personal loan, a business loan, a rental agreement, a will, a trust agreement, an insurance agreement, real estate lease, or the like.

In another example, the instance of the smart contract application when executed may enable the processor to receive a contract participating hash value from a contract participating device. The contract participating hash value may indicate a further executed portion of the smart contract was signed by the party associated with the contract participating device. The instance of the smart contract application executing on the processor may store the contract participating hash value as a subsequent transaction in the private blockchain. In an example, the subsequent transaction may be associated with the contract participating hash value, a smart contract address in the private blockchain and the first user address in the private blockchain.

Figure 5A:
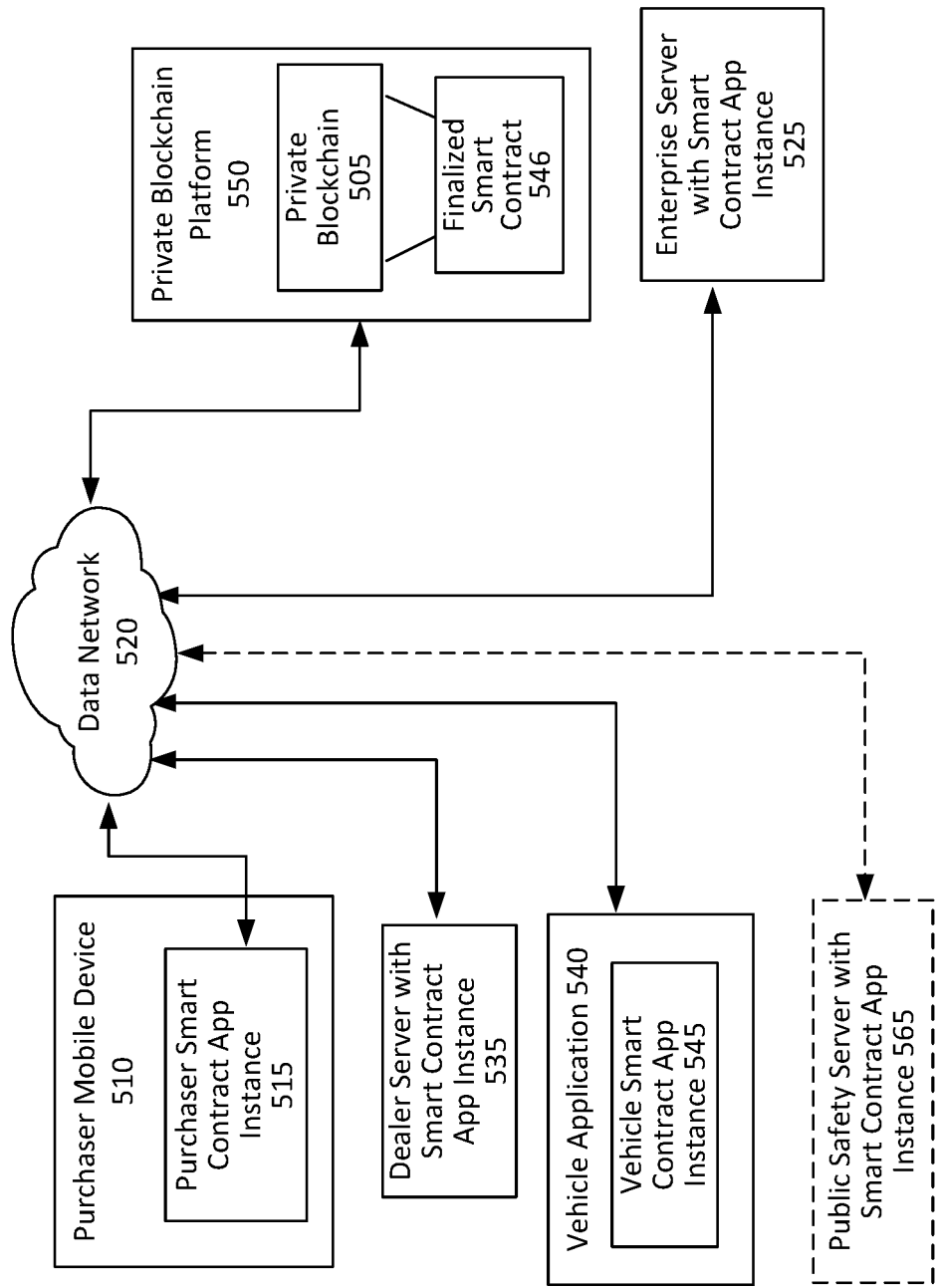
FIG. 5A illustrates an example of a system illustrating an example implementation of an example of a smart contract.

FIG. 5A illustrates an example of a system illustrating an example implementation of a smart contract. In the system example of FIG. 5A, the system 500 may function based on instances of the smart contract application executing in digital wallets of a number of the system elements, such as the auto owner, the dealer server, the vehicle, the enterprise server, and, optionally, public safety server (with an instance of the smart contract application 565. In the example system, programming code of a smart contract may be operable to connect to systems external to the smart contract. For example, the external systems may be accessible via hypertext transfer protocol (HTTP), but also any other communication protocol.

In an example, the system 500 may include a data network 520, a private blockchain platform 550, an enterprise server (with an instance of a smart contract application) 525, a purchaser mobile device 510, a dealer server (with an instance of a smart contract application) 535, and a vehicle application 540. The data network 520 may interconnect the other elements, such as 510, 525, 535, 540 and 550 in the system 500. The private blockchain platform 550 may retain a smart contract 505. The smart contract 505 may, in this example, be an automobile purchase contract with additional conditions related to payment terms, transfer of possession, and, ultimately, transfer of ownership upon satisfaction of the terms of the smart contract 505. The vehicle wallet 545 of the purchased vehicle may include an instance of the smart contract application that is executed by a processor of the purchased vehicle. For example, the purchased vehicle may include programming code, such as Apple CarPlay®, Android Automotive OS®, or the like that enables the vehicle to connect to a data network such as 520. The data network 520 may be the internet, a cellular network, or the like.

Figure 5B:
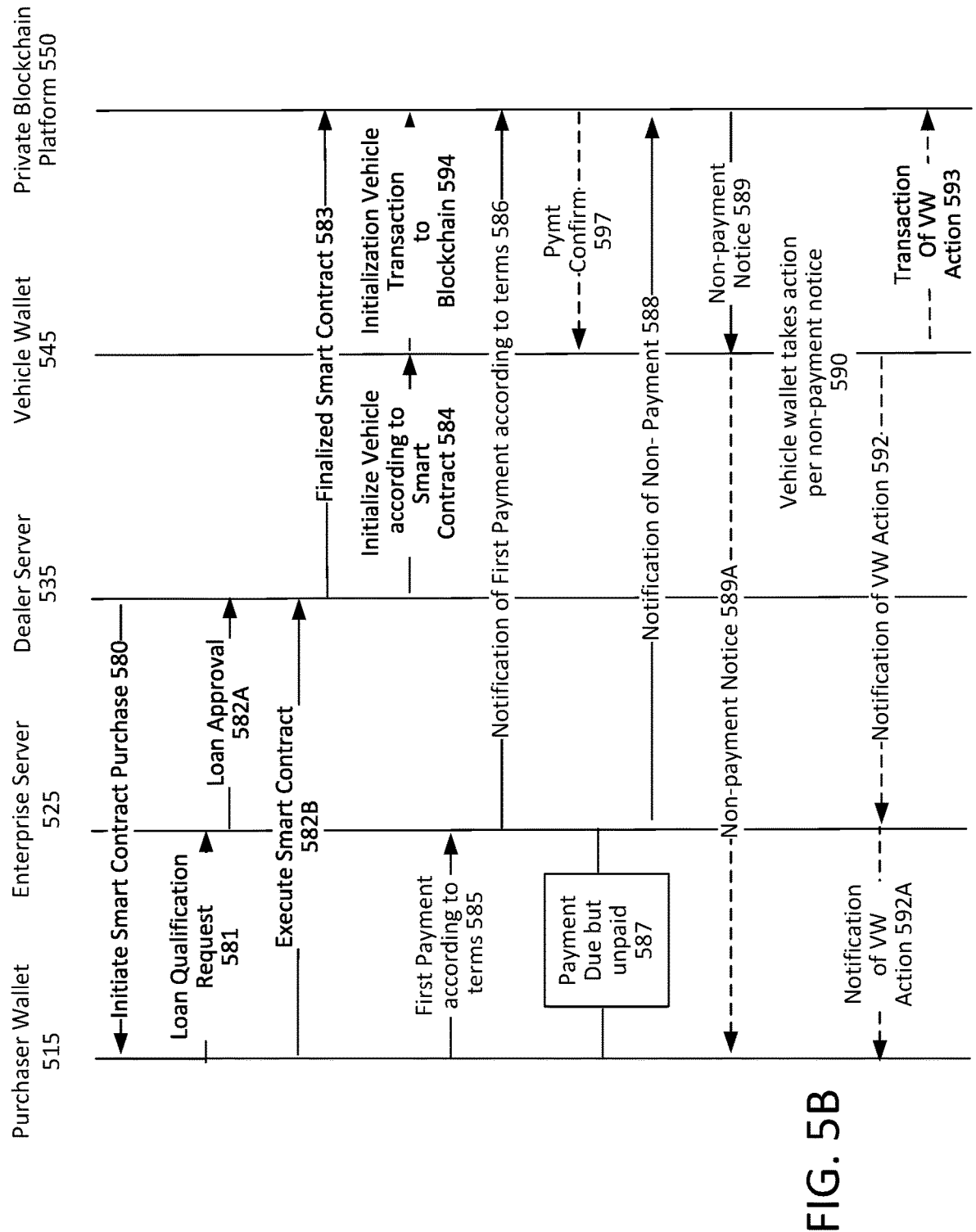
FIG. 5B illustrates an example of the exchange of communications in the example system of FIG. 5A.

FIG. 5B illustrates an example of the exchange of communications in the example system of FIG. 5A. In FIG. 5B, an automobile dealer may be an entity that sells automobiles to purchasers of automobiles. The automobile dealer may communicate electronically with other devices via a dealer server 535 as shown in FIG. 5A. To participate in and utilize smart contracts, the automobile dealer may have a digital wallet, such as dealer server 535. The purchasers may be persons or entities (e.g., rental car companies or the like) that purchase and take possession of the automobiles sold by the automobile dealers. Similarly, in order to participate in and utilize smart contracts, the purchaser or person in possession of the automobile may have an automobile purchaser mobile device, such as 510 of FIG. 5A, that has a purchaser wallet 515. An enterprise may be a financial institution that provides automobile financing and loans. The enterprise may provide the enterprise server 525, which may communicate with the automobile dealer server 535 and a purchaser wallet 515. As discussed with reference to FIGS. 2-4, the dealer and a purchaser may negotiate terms of a sale of an automobile, the enterprise and the purchaser may negotiate terms of an automobile loan and financing based on the terms of the sale of the automobile between the dealer and the purchaser. All of the terms and conditions of the loan and financing, payment to the dealer may be memorialized in a smart contract, such as 505 of FIG. 5A. The smart contract may be stored on the private blockchain platform 550. The private blockchain platform 550 may also provide the processing devices for execution of the programming code of the smart contract 505.

In an optional example, the public safety server with the smart contract application instance 565 may be operable to receive notifications regarding a status of the vehicle, such as stolen, repossessed so that law enforcement do not apprehend the reprocessing person, abandoned, or the like.

In the example of FIG. 5B, the automobile dealer and purchaser may agree upon the purchase of an automobile by the purchaser. The automobile dealer via the dealer server 535 may initiate a smart contract purchase (580). For example, the initiation of the smart contract purchase (580) may entail the dealer server 535 generating a smart contract from a smart contract template. The dealer server 535 may input information relevant to the automobile to be purchased and dealer information for receipt of payment for the vehicle. The dealer server 535 may forward the smart contract to the purchaser wallet 515. The purchaser wallet 515 may execute on a mobile device that has an instance of the smart contract application described above with reference to the examples of FIGS. 1-4. The purchaser wallet 515 may be operable via the instance of the smart contract application executing on the purchaser mobile device 510 to input information into a smart contract template, such as through the fillable input fields, sent by the dealer server 535 as part of the initiate smart contract purchase (580). The instance of the smart contract application executing on the purchaser mobile device 510 may determine that sufficient information for making a loan request (e.g., verifiable purchaser identifying information, income information, employment history, and the like) has been input into the smart contract. With the input of sufficient information, the instance of the smart contract application executing on the purchaser mobile device 510 may forward loan qualification request (581) to the enterprise server 525 for evaluation.

At 582A, the enterprise server 525 may approve the loan and forward the loan approval to the dealer server 535. The purchaser wallet 515 may execute the smart contract (582B) to indicate the purchaser of the automobile agrees to the terms and conditions of the smart contract. The dealer server 535 may forward a finalized smart contract (583) to the private blockchain platform 550 for posting of the finalized smart contract 546 to a blockchain, such as 505, maintained or managed by the private blockchain platform 550. Multiple finalized smart contracts in addition to finalized smart contract 546 may be posted to the blockchain 505

The dealer server 535 may, in response to the finalized smart contract, initialize the vehicle according to the finalized smart contract (583). For example, the dealer server 535 may during the initialization of the vehicle (584) provide information related to the smart contract maintained in the blockchain 505 to the vehicle wallet 545. For example, the provided information may include encrypted authentication key information related to the finalized smart contract, smart contract identifying information, or the like. The vehicle wallet 545 may optionally generate an initialization vehicle transaction to the blockchain (594) that is sent to the private blockchain platform 550 for storage as a transaction in the blockchain 505 as an acknowledgement that the vehicle has been initialized according to a smart contract identified in the finalized smart contract (583) message.

The purchaser may make a payment according to the terms and conditions of the smart contact via the purchaser wallet 515. The first payment according to terms (585) may be sent from the purchaser wallet 515 to the enterprise server 525. The enterprise server 525 may send a notification of first payment according to terms (586) to the private blockchain platform 550 for storage as a transaction in the blockchain 505.

In an optional exchange, the programming code of the smart contract may cause the private blockchain platform 550 to generate a payment confirmation (597) to be sent to the vehicle wallet 545. In an example, the vehicle wallet 545 may be operable to execute remedial actions, in the case that a payment confirmation according to the terms of the smart contract is not received. Alternatively, the vehicle wallet 545 may be operable to respond only to specific non-payment-related messages.

The notification of payment messages (585) and (586) (and (597), if enabled) may continue for the term of the smart contract. While not shown, receipt of the final payment by the enterprise server 525 may trigger the transfer of the automobile title from the enterprise to the purchaser. The enterprise server 525 may generate a message for storage as a transaction in the blockchain indicating that the loan has been satisfied.

In an example, the purchaser may fail to make a payment (587). In response to the failure to receive payment (587), the enterprise server 525 may generate a notification of non-payment (588) message for delivery to the private blockchain platform 550 for generation of a transaction to be stored in the blockchain.

The private blockchain platform 550 may enable the finalized smart contract to generate a message in response to receipt of the notification of non-payment 588. For example, the programming code of the smart contract may be operable to generate a non-payment notice and cause the non-payment notice (589) to be sent to the vehicle wallet 545. The instance of the smart contract application executing on the vehicle wallet 545 may generate a non-payment notice (589A) that is sent to the purchaser wallet 515. The vehicle wallet 545 may be coupled to an ignition system of the vehicle or other system affecting operation of the vehicle. The vehicle wallet 545 may act according to the non-payment notice 590. For example, if the vehicle is parked, the vehicle wallet 545 may be operable to disable the ignition system of the vehicle. The vehicle wallet 545 may also be operable to, optionally, generate notifications, such as notification of vehicle wallet (VW) action 592 that is sent to the enterprise server 525. The enterprise server 525 may be operable to, optionally, send a notification of the VW action (592A) to the purchaser wallet 515. In addition, the vehicle wallet 545 may send a message to the private blockchain platform 550 for generation of a transaction of the VW action (593).

The instance of the smart contract application executing on the various devices, such as the purchaser's mobile device, and the vehicle processor, as well as the programming code of the smart contract may enable a number of functions and actions. For example, lack of payment of the required payments may enable the smart contract to initiate a repossession process that notifies the vehicle wallet 545 of an identity of a repossession professional who may access the vehicle for purposes of repossession. The vehicle wallet 545 may also be able to access location services of the vehicle to notify the enterprise server 525 of the location of the vehicle. In some examples, if the vehicle is stolen, a purchaser using the smart contract application may notify the enterprise server 525, which notifies the smart contract in the blockchain of the stolen vehicle. Programming code of the smart contract may notify the vehicle wallet 545 to act and may cause the generation of a message notifying law enforcement of the stolen vehicle.

Blockchain technology and techniques may be used to mitigate problems with smart contract security and smart contract integrity by creating transactions in the blockchain application platform ("the blockchain") that are immutable and visible to all. It is extremely difficult for a bad actor to change a validated transaction in the blockchain. By storing a hash of a smart contract on the blockchain, any party can later prove the legality of their copy without having to have expensive trusted third parties to store a copy of a smart contract. In addition, a blockchain solution also adds security and reduces costs as users only pay for the processing power needed to execute a smart contract configuration application and validate and store an electronic signature, a smart contract, related information or the like.

The benefits of blockchain technology may be summarized in five basic principles of blockchain technology: 1) a distributed database, 2) peer-to-peer transmission, 3) transparency and anonymity, 4) irreversibility of records, and 5) computational logic. With a distributed database, each party on a blockchain has access to the entire database and its complete history. For example, no single party controls the data or the information. Every party can verify the records of its transaction partners directly, without an intermediary. Communication occurs directly between peers instead of through a central node. Each node stores and forwards information to all other nodes. In public blockchains, every transaction and its associated value are visible to anyone with access to the system. Each node, or user, on a public blockchain may, for example, have a unique 30-plus-character alphanumeric address that identifies it. Users can choose to remain anonymous or provide proof of their identity to others. Transactions occur between blockchain addresses. As for the irreversibility of records, once a transaction is entered in the blockchain, and the accounts are updated, the records cannot be altered, because the records are linked to every transaction record that came before them (hence the term "chain"). Various computational algorithms and approaches are deployed to ensure that the recording in the blockchain is permanent, chronologically ordered, and available to all others on the network. The digital nature of the ledger means that blockchain transactions can be tied to computational logic and programmed. As a result, users can set up algorithms and rules that automatically trigger transactions between nodes in the blockchain.

There are several different blockchain application platforms and protocols in use. As a way of comparison between the several different blockchain application platforms and protocols, the Ethereum blockchain application platform and the Hyperledger Fabric blockchain application platform are discussed in more detail. However, the disclosed examples should not be limited to these two specific blockchain application platforms since the examples and techniques described herein and referenced in the claims are intended to be implementable on any blockchain application platform.

The Ethereum blockchain application platform (referred to as "Ethereum") may, for example, provide features such as anonymity, full transparency, openness to the public, one single ledger, an extremely large network, security derived from network size, and all nodes (called "miners") in the blockchain are equal. In Ethereum, a block holds a fixed amount of data. Multiple transactions may be stored into a block until the block is filled. Once all nodes are filled in, the network compares blocks. Once a majority of nodes in the network agree on the contents of the block, the block is encrypted and linked ("chained") to another block in the existing blockchain. Ethereum may utilize digital wallets that are gateways to decentralized applications on the Ethereum blockchain that allow the digital wallet owner the ability to hold cryptocurrency built on Ethereum as well as write, deploy and use smart contracts. While Ethereum is a public blockchain, Ethereum may also be made private by using the open source code in a private network.

Conversely, Hyperledger Fabric is a private blockchain application platform (referred to herein as "Hyperledger") having features, such as named users, users need permission from other users to interact, closed to the public, multiple ledgers (e.g., multiple blockchains called channels in Hyperledger), a smaller network, a security derived from an access control list (ACL), three levels of nodes (e.g., endorser, peer and orderer nodes), complex, fast, low-cost, and honesty to protect reputation. For example, a transaction in a smart contract implemented in Hyperledger may have consensus, provenance (all recorded transactions are permanent), immutability (cryptographically linked), finality (single source of finality) and privacy.

As an example, a named user in Hyperledger may announce a transaction, and the transaction may be managed by a smart contract (that may utilize a "chaincode"). In some examples, a smart contract function is executed only by the selected endorser nodes. For example, endorser nodes agree on the result of the transaction/code execution prior to the transaction being added to the blockchain. Only the endorser nodes (or nodes granted permission presumably by all nodes in the transaction) may have access to the blockchain (or ledger), and since all parties agree to the content of data in the ledger the ledger does not need to be reconciled or audited by the respective parties to the smart contract. However, in cases where enterprise compliance or government regulations are involved, the ledger may be audited with permission of the parties by the enterprise or a governmental body to confirm, for example, regulatory or statutory compliance regarding information in the smart contract.

The operational example may include the smart contract configuration component 144 delivering the selected smart contract to a smart contract address associated with the selected smart contract in a blockchain, such as 105. The smart contract configuration component 144 may send to the smart contract configuration application instance 141A executing on the first user's computing device 101A, the selected smart contract address of the selected smart contract that is stored in the blockchain 105. In some examples, the blockchain 105 may be part of a larger blockchain platform. For example, if the blockchain 105 is part of a private blockchain platform (e.g., Hyperledger Fabric), information associated with the selected smart contract may only be accessible by the first user and any other users the first user authorizes and provides with the address of the selected smart contract. The first user may or may not encrypt the information. Conversely, if the blockchain 105 is part of a public blockchain platform (e.g., Ethereum), any user with the address of the selected smart contract may access the information in the smart contract. However, to ensure privacy, the smart contract referenced by the hash stored in blockchain 105 may be encrypted, so access is limited to only the first user and any other authorized user having the encryption key.

Figure 6:
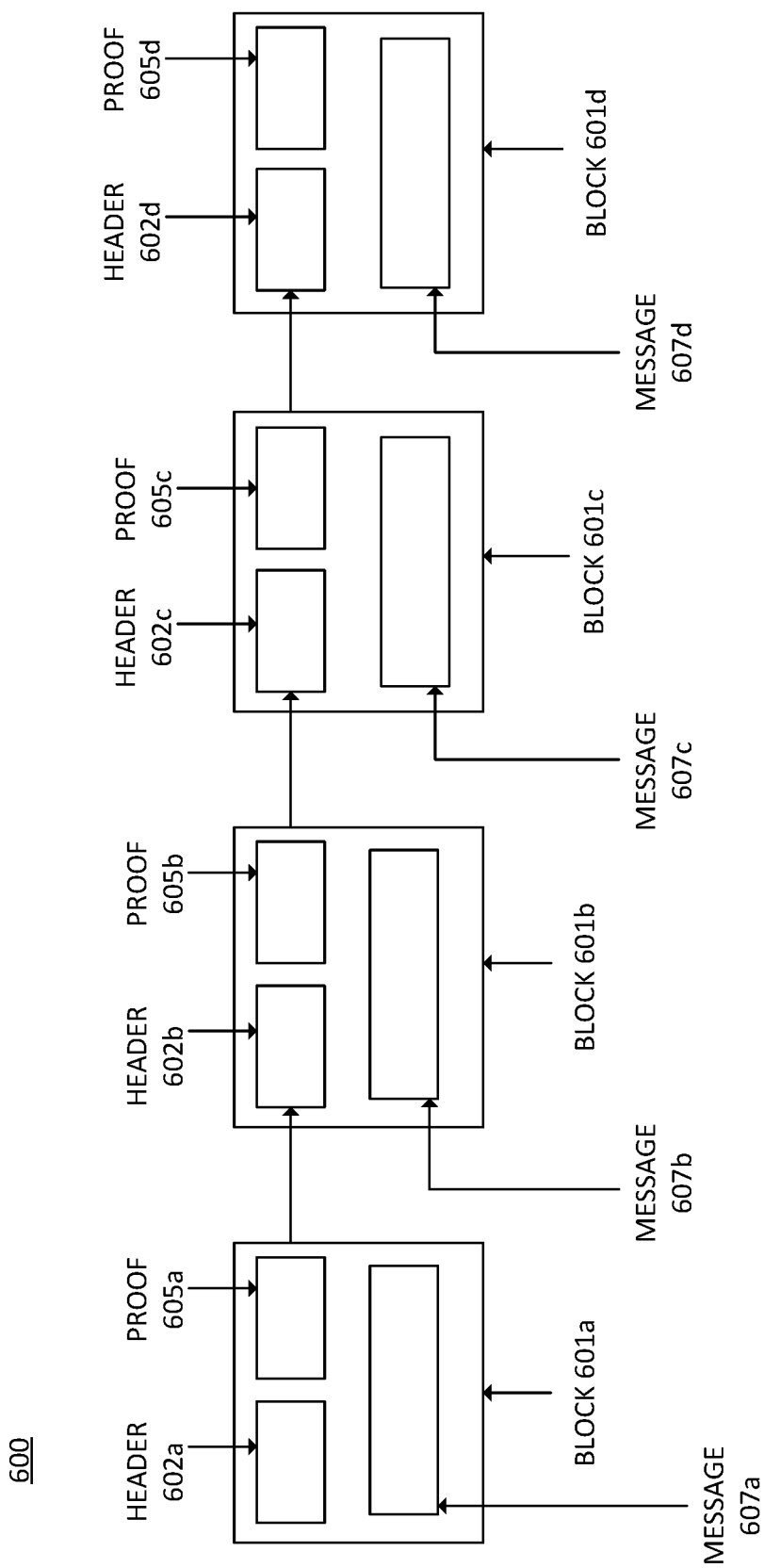
FIG. 6 depicts a logical model of an example of a blockchain, consistent with disclosed examples.

It may be helpful to provide some details of a blockchain, such as that described with respect to the examples of FIGS. 1-5B. FIG. 6 depicts a logical model of an example of a blockchain, such as 105, consistent with disclosed examples. In the example of FIG. 1, the blockchain 105 may include many such blockchains maintained by many different systems (e.g., computing devices 101A-C and 102, or other systems) and computing devices (such as 101A-C and 102). In the logical model 600, such blockchain examples may comprise data-storage blocks, such as blocks 601a-601d. Blocks of the blockchain may include transactions, such as messages 607a-607d. Generally, blocks in the blockchain may include a header, such as headers 602a-602d, and each header uniquely identifies each block. The headers 602a-602d may, for example, include a hash value generated by a hash function. As mentioned above, a hash function is any function that can be used to map input data of arbitrary size to a hash value of a fixed size. For example, a header may include at least one of the previous block's hash value, a hash value generated based on any transactions in the block (e.g., a Merkle root), and a timestamp. Consistent with disclosed examples, system 600 may require that blocks added to blockchain 105 in the example of FIG. 1 satisfy at least one of a proof-of-work condition and an electronic signature condition. For example, the headers 602a-602d may include a nonce chosen to ensure the header satisfies the proof-of-work condition, such as 605a-605d. As a non-limiting example, the proof-of-work condition 605a-605d may require the hash of the header fall within a predetermined range of values. As an additional example, the header may be digitally signed with a cryptographic key of an authorized system, and the electronic signature may be included in the header. This electronic signature may be verified using a key available to the members of system 600.

Figure 7:
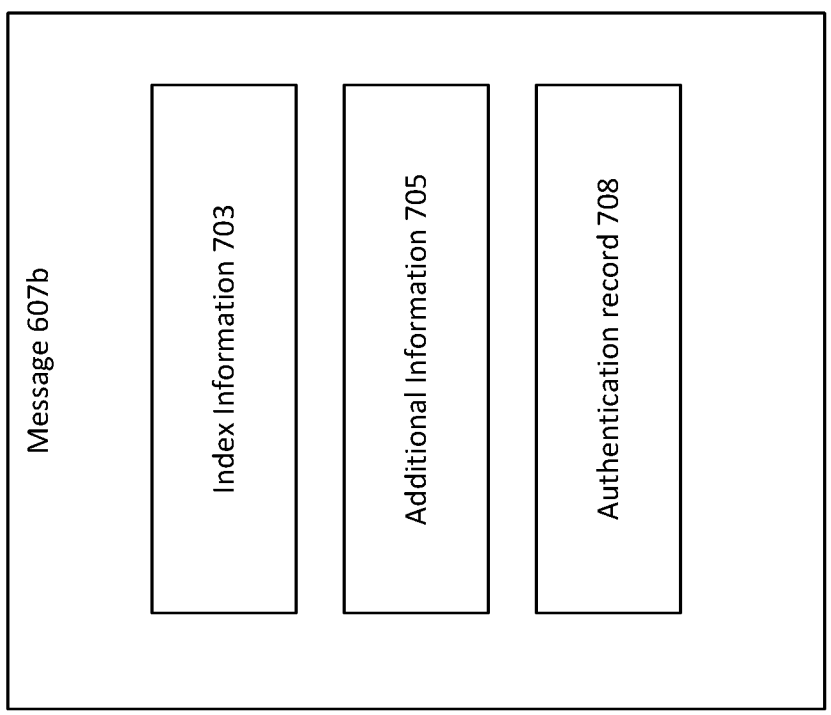
FIG. 7 depicts a logical model of a message stored in a blockchain, such as the blockchain element in FIG. 5, consistent with disclosed examples.

FIG. 7 depicts a logical model of a message 607b stored in a blockchain (e.g., an element of blockchain 105), consistent with disclosed examples. In some examples, message 607b may comprise index information 703. In certain examples, index information 703 may comprise information identifying a user. For example, index information 703 may be at least one of a full name, email address, phone number, or other non-sensitive personal information of the user. In various examples, index information 703 may include one or more references to earlier blocks in the private blockchain. For example, index information 703 may include one or more references to one or more earlier blocks associated with the same user. A reference may include, as a non-limiting example, a hash of a preceding block in the blockchain associated with the same user. In some examples, index information 703 may be obfuscated or encrypted according to methods known to one of skill in the art. For example, index information 703 may be encrypted with a cryptographic key. As an additional example, index information 703 may comprise a hash of at least one of a full name, email address, phone number, or other non-sensitive personal information of the user.

Message 607b may comprise additional information 705, consistent with disclosed examples. The amount of additional information is limited by the amount of data storage, or memory, available in the blockchain. If a block of the blockchain has more data storage or memory available, the amount of additional information that can be included in the message 607b includes greater amounts of information. Examples of additional information 705 include information related to a smart contract including conditions and terms, programming code version information for each section, timestamps, or the like. In various examples, the additional information 705 may be obfuscated or encrypted according to methods known to one of skill in the art. For example, the additional information 705 may be encrypted with a cryptographic key.

Message 607b may comprise authentication record 708, consistent with disclosed examples. In some examples, authentication record 708 may comprise information enabling subsequent auditing of transactions. For example, authentication record 708 may identify at least one of computing devices, such as 101A-C, a commercial institution associated with computing devices, such as 101A-C, a purpose of the authentication request, a result of the authentication request, and information related to the authentication request. In some examples, a purpose of the authentication request may include the creation of a relationship (e.g., a financial relationship, such as a bank account, brokerage account, credit card account, and/or loan account) with a commercial institution associated with computing device, such as 101A-C, or the performance of a service by computing device, such as 101A-C (e.g., a financial server, such as performing transactions in a financial account associated with the user, cashing a check provided by the user, selling a cashier's check to the user, and/or debiting a user's account once or periodically to make payments on a loan). As would be appreciated by one of skill in the art, the above authentication purpose examples are not intended to be limiting. In some examples, a result of the authentication request may include whether the purpose of the authentication request was achieved. For example, when the purpose of the authentication request was the creation of a relationship, the result of the authentication request may indicate whether the relationship was created. As another example, when the purpose of the authentication request was the performance of a service, the result of the authentication request may indicate whether the service was performed. As would be appreciated by one of skill in the art, the above authentication result examples are not intended to be limiting. In some examples, information related to the authentication request may include additional contact information, demographic information, financial information, or similar personal information provided in connection with the authentication request. In some examples, such information may merely indicate that such information was provided, and/or provide a location where such information may be obtained. In some examples, authentication record 708 may be obfuscated or encrypted according to methods known to one of skill in the art. For example, authentication record 708 may be encrypted with a cryptographic key.

Cryptographic keys may be used to encrypt elements of transactions in blocks, consistent with disclosed examples. In some examples, such cryptographic keys may be associated with users of computing device, such as 101A-C and 102 in FIG. 1. In various examples, at least some of the cryptographic keys may be associated with authorized systems. Corresponding cryptographic keys may be available to decrypt the encrypted message elements, consistent with disclosed examples. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element. In some examples, the corresponding cryptographic keys may be available to users of user contract participating computing devices 101A-C and computing device 102.

Figure 8:
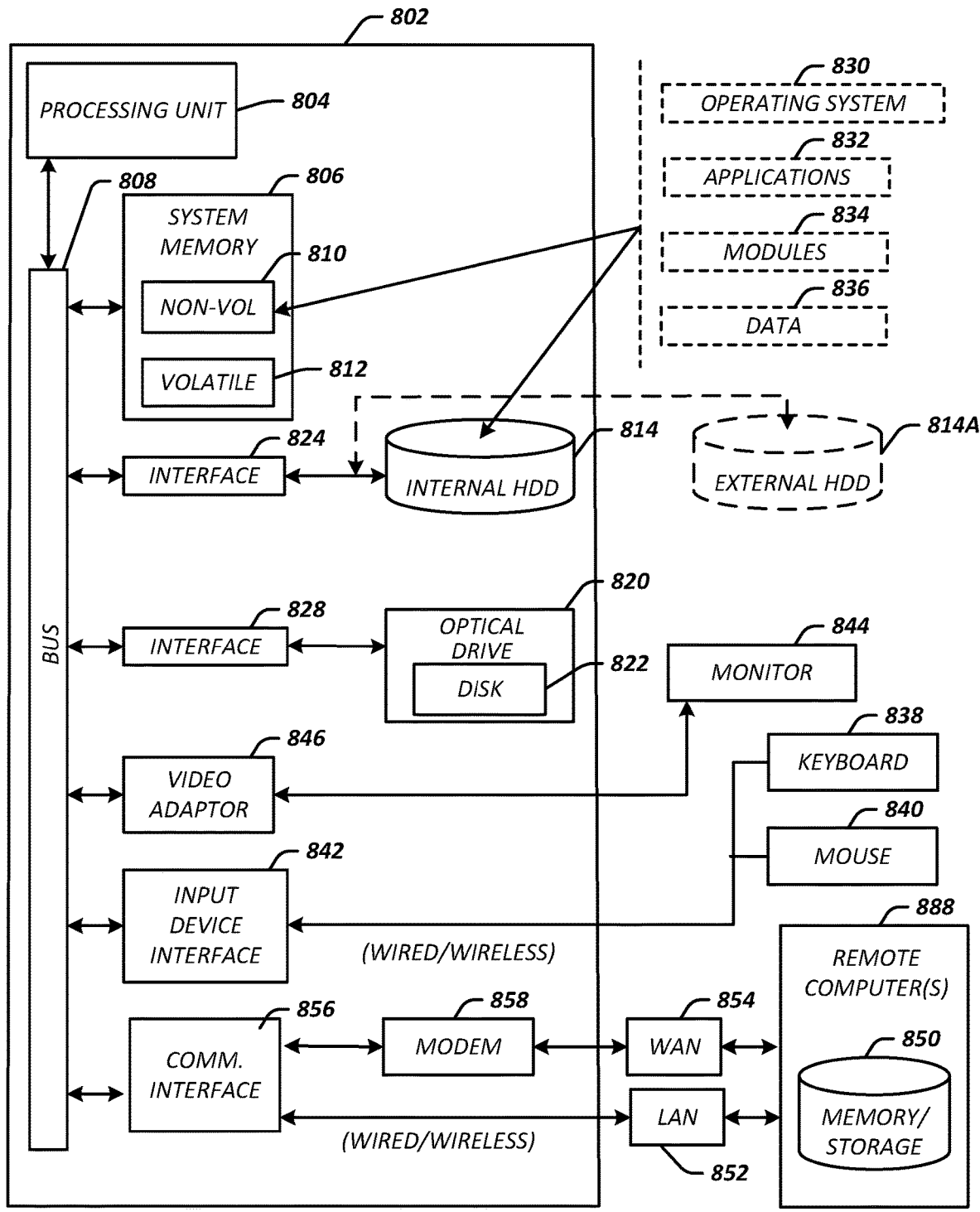
FIG. 8 illustrates an example of a computing architecture suitable for implementing the devices, systems, and techniques described with respect to FIGS. 1-7.

FIG. 8 illustrates an example of a computing architecture 800 suitable for implementing various embodiments as previously described. In one example, the computing architecture 800 may include or be implemented as part of networking environment 100.

In an example of an apparatus, the apparatus may include a processor, one or more wireless communication transceivers, a display device and a memory. The processor may be operable to execute programming code. The one or more wireless communication transceivers may be coupled to the processor and be operable to establish a wireless communication link. For example, the one or more wireless communication transceiver may be at least one of: a Bluetooth transceiver, a near-field radio frequency transceiver, a wi-fi transceiver, an optical transceiver, or a cellular transceiver. The processor may be operable to access the smart contract library via one of the one or more wireless communication transceivers.

The display device may be coupled to the processor and be operable to display content in response to commands from the processor. The memory may be coupled to the processor and operable to store information and the programming code executable by the processor. In addition, the memory may include a secure element operable to store a first user address in a private blockchain, and a private cryptographic key or a public cryptographic key. For example, transactions on a Bitcoin blockchain generally have an input (one or more sources of digital currency spent) and an output (one or more "sinks" or places where the digital currency goes). These all stem from some "genesis" that populates an initial store of value for a coin. In the example of distributed ledgers not involving a currency, there may be a genesis block, but transactions are linked to each other using an ordering service rather than inputs and outputs of currency. Thus, a system such as that shown in the examples may have a coordinated view of time (and relativity, from the physics notion) to ensure a transaction obtains the necessary endorsements to complete successfully.

As used in this application, the terms "system" and "component" are intended to refer to a computer-related entity, either hardware, a combination of hardware and software, software, or software in execution, examples of which are provided by the example computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data transactions. Such data transactions may be sent across various connections. Examples of connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 includes a processing unit 804, a system memory 806 and a system bus 808. The processing unit 804 can be any of various commercially available processors. The identity and smart contract system 140 of FIG. 1 may incorporate one or more of the components of the computer architecture 800, such as the processing unit 804, the system memory 806 and so on. Other components, such as the keyboard 838 and the mouse 840, may be omitted in some examples identity and smart contract system 140 of FIG. 1. The one or more of the components of the computer architecture 800 may be incorporated in the computing devices 101A-C and 102.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may include or implement various articles of manufacture. An article of manufacture may include a non-transient computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing device 802 may include various types of computer-readable storage media in the form of one or more lower speed memory units, including an internal hard disk drive (HDD) 814 or external HDD 814A, and an optical disk drive 820 to read from or write to a removable optical disk 822 (e.g., a CD-ROM or DVD). The internal HDD 814 and optical disk drive 820 can be connected to the system bus 808 by an HDD interface 824 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, several program modules can be stored in the drives and memories 810, 812, including an operating system 830, one or more application programs 832, other program modules 834, and program data 836. In one embodiment, the one or more application programs 832, other program modules 834, and program data 836 can include, for example, the various applications and/or components of the computing architecture 800.

A user can enter commands and information into the computing device 802 through one or more wired/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processing unit 804 through an input device interface 842 that is coupled to the system bus 808 but can be connected by other interfaces such as a parallel port, IEEE 1394 serial port, a game port, a USB port, an IR interface, and so forth.

A display device 844 or another type of display device is also connected to the system bus 808 via an interface, such as a video adaptor 846. The display device 844 may be internal or external to the computing device 802. In addition to display device 844, a computer typically includes other peripheral output devices, such as speakers, printers, and so forth. For example, the selected template may be presented on the display device 844. The processing unit 804 may enable a graphical user interface on the display device 844. The graphical user interface may be operable to enable revision of the terms and conditions in the one or more sections of the selected template and storing of the selected template with revisions to the terms and conditions in the memory.

The computing device 802 may operate in a networked environment using logical connections via wire and/or wireless communications to one or more remote computers, such as a remote computer 888. The remote computer 888 can be a workstation, a server computer, a router, a personal computer, portable computer, microprocessor-based entertainment appliance, a peer device or other common network node, and typically includes many or all the elements described relative to the computing device 802, although, for purposes of brevity, only a remote memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies and facilitate enterprise-wide computer networks, such as intranets, all of which may connect to a global communications network, for example, the Internet.

For example, identity and smart contract system implemented according to the example of FIG. 8 may authenticate the identity of one or more users related to transactions stored at an address in the blockchain. As explained through the description of the examples of FIGS. 1-6, the combination of using a smart contract application provides a level of security and service from the enterprise that is presently unavailable. An instance of the smart contract configuration application may be stored in memory 812 or any one of the internal HDD 814 or external HDD 814A, usable to implement the hardware and process examples described with reference to FIGS. 1-6 above.

When used in a LAN networking environment, the computing device 802 is connected to the LAN 852 through a communication interface 856 that may be either wired and/or wireless. The communication interface 856 can facilitate wired 250 and/or wireless communications to the LAN 852, which may also include a wireless access point disposed thereon for communicating with the wireless functionality of the communication interface 856.

When used in a WAN networking environment, the computing device 802 can include a modem 858, or is connected to a communications server on the WAN 854 or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing device 802, or portions thereof, can be stored in the remote memory/storage device 850. It will be appreciated that the network connections shown are examples and other means of establishing a communications link between the computing devices and computers can be used.

The computing device 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices, apparatuses or systems as previously described with reference to FIGS. 1 and 6-8 may include various hardware elements, software elements, or a combination of both. Examples of hardware elements may include structural members, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

While the foregoing examples refer to smart contracts and the execution of smart contracts, the above described examples may be useful in other areas, such as manufacturing, supply chain applications, auctions and online marketplaces, advertising and media sales, healthcare, and education, inventory management, Internet-of-Things/Smart device/Autonomous devices, banking and financial services, eCommerce, hospitality, law enforcement, government operations, insurance or the like.

What is claimed is:
1. A method comprising:
accessing, by a contract-creating computing device, a smart contract library comprising a plurality of templates of different legal contracts implementable as a smart contract between respective parties in the smart contract, wherein:
  each template of the plurality of templates includes a plurality of sections having different contractual terms and conditions and fillable fields for specific contract terms, and
  each respective section of the plurality of sections includes programming code operable to evaluate compliance with specific section-related contractual terms and conditions of a respective section and with any specific contract terms input to a fillable field of the respective section;
receiving a selection of a template of a smart contract from the plurality of templates for implementation as a finalized smart contract;
generating the finalized smart contract having sections with the specific contract terms and conditions and the programming code operable to evaluate compliance with the specific contract terms;
obtaining a private cryptographic key assigned to a first user of the contract-creating computing device, wherein the private cryptographic key is associated with a public cryptographic key;
generating a first user address associated with the contract-creating computing device in a private blockchain, wherein the first user address is based on the private cryptographic key and is associated with the first user in the private blockchain;
generating a smart contract address for the finalized smart contract using the first user address and a nonce value;
generating a smart contract hash value using a value related to programming code of the finalized smart contract as an input into a hash function;
storing the smart contract hash value as a transaction in the private blockchain, wherein the transaction is associated with the smart contract hash value and the first user address in the private blockchain;
receiving from a second party contract participating device a revision to a section of the finalized smart contract, wherein the section with the revision is a revised section of the finalized smart contract;
modifying programming code of the revised section of the finalized smart contract based on the received revision to the finalized smart contract, wherein the modified programming code implements a compliance scheme to ensure different terms or conditions related to the revision of the revised section of the finalized smart contract are fulfilled;
tracking revisions to the finalized smart contract including the modified programming code;
upon no longer tracking a further revision due to completion of the revisions to the finalized smart contract, generating a programming code hash of the modified programming code of the revised section of the finalized smart contract;
generating a subsequent smart contract hash value of revised text included in the received revision of the revised section of the finalized smart contract; and
storing, in addition to the subsequent smart contract hash value, the programming code hash of the modified programming code of the revised section of the finalized smart contract as part of a revision-related trans- action to the private blockchain, wherein the revision-related transaction is associated with the smart contract address for the finalized smart contract, a second party contract participating device address, and the first user address in the private blockchain.

2. The method of claim 1, further comprising:
revising one or more sections of a plurality of sections of the selected template, wherein revising includes inputting specific contract terms in the fillable field of the one or more sections of the selected template; and
assembling all sections of the selected template including the revised one or more sections of the selected template into the finalized smart contract, wherein each section of the plurality of sections of the selected template includes programming code that implements a compliance scheme to different terms or conditions related to each respective section of the finalized smart contract.

3. The method of claim 2, further comprising:
prior to assembling all the sections of the selected template, receiving an updated section of the one or more sections from the contract computing device, wherein the updated section includes a revision to the inputted specific contract terms in the fillable field of the updated section or a specific section-related contractual terms; and
replacing an identical section of selected template with the updated section for assembling.

4. The method of claim 1, further comprising:
executing a portion of the finalized smart contract, wherein the executed portion indicates acceptance of the terms and conditions including the specific contract terms.

5. The method of claim 1, wherein selecting the template of the smart contract further comprises:
receiving an indication that the selected template is related to one of: an automobile purchase, an automobile lease, a personal loan, a business loan, a rental agreement, a will, a trust agreement, or an insurance agreement; and
accessing a data storage containing the selected template identified by the received indication, wherein the selected template includes programming code for implementing the smart contract based on the selected template.

6. The method of claim 1, further comprising:
sending a message related to the finalized smart contract for delivery to a contract participating device, wherein the contract participating device is different from the contract-creating computing device;
receiving, from the contract participating device, a contract participating hash value indicating a further executed portion was executed by a party associated with the second party contract participating device; and
storing the contract participating hash value as a subsequent transaction in the private blockchain, wherein the subsequent transaction is associated with the contract participating hash value, a smart contract address in the private blockchain, and the first user address in the private blockchain.

7. The method of claim 6, further comprising:
receiving authentication information from the second party contract participating device;
authenticating the second party contract participating device based on the received authentication information; and providing access to a secure collaborative environment within a network environment to the second party contract participating device, wherein the secure collaborative environment within the network environment enables collaborative revision of one or more sections of the finalized smart contract.

8. The method of claim 7, further comprising:
receive a notification of a revision to the one or more sections of the smart contract within the collaborative environment.

9. The method of claim 1, further comprising:
receiving an indication of execution of a portion of the smart contract, wherein the executed portion indicates acceptance of contractual terms and conditions in the finalized smart contract.

10. The method of claim 1, wherein the revision-related transaction is an initial transaction stored in the private blockchain prior to storing the smart contract hash value.

11. A non-transitory computer readable medium embodied with programming code that when executed by a processor causes the processor to:
access a smart contract library comprising a plurality of templates of different legal contracts implementable as a smart contract between respective parties in the smart contract, wherein:
 each template of the plurality of templates includes a plurality of sections having different contractual terms and conditions and fillable fields for specific contract terms, and
 each respective section of the plurality of sections of the smart contract includes programming code operable to evaluate compliance with specific section-related contractual terms and conditions of a respective section and with any specific contract terms input to a fillable field of the respective section;
receive a selection of a template of a smart contract from the plurality of templates for implementation as a finalized smart contract;
generate the finalized smart contract having sections with the specific contract terms and conditions and the programming code operable to evaluate compliance with the specific contract terms;
obtain a private cryptographic key assigned to a first user of a contract-creating computing device, wherein the private cryptographic key is associated with a public cryptographic key;
generate a first user address associated with the contract-creating computing device in a private blockchain, wherein the first user address is based on the private cryptographic key and is associated with the first user in the private blockchain;
generate a smart contract address for the finalized smart contract using the first user address and a nonce value;
generate a smart contract hash value using a value related to programming code of the finalized smart contract as an input into a hash function; and
store the smart contract hash value as a transaction in the private blockchain, wherein the transaction is associated with the smart contract hash value and the first user address in the private blockchain;
receive a revision to a section of the finalized smart contract made by a second party contract participating device, wherein the section with the revision is a revised section of the finalized smart contract and the second party contract participating device is different from the contract-creating computing device;

modify programming code of the revised section of the finalized smart contract based on the received revision to the finalized smart contract, wherein the modified programming code implements a compliance scheme to ensure different terms or conditions related to the revision of the revised section of the finalized smart contract are fulfilled;

track revisions to the finalized smart contract;

upon no longer tracking a further revision due to completion of the revisions to the finalized smart contract, generate a programming code hash of the modified programming code of the revised section of the finalized smart contract;

generating a subsequent smart contract hash value of revised text included in the received revision of the revised section of the finalized smart contract; and store the programming code hash of the modified programming code of the revised section of the as part of a revision-related transaction in addition to the subsequent smart contract hash value to the private blockchain, wherein the revision-related transaction is associated with the smart contract address for the finalized smart contract, an address of the second party contract participating device, and the first user address in the private blockchain.

12. The non-transitory computer readable medium of claim 11, further embodied with the programming code that when executed causes the processor to:

revise one or more sections of a plurality of sections of selected template, wherein revising includes inputting specific contract terms in the fillable field of the one or more sections of selected template; and assemble all sections of selected template including the revised one or more sections of selected template into the finalized smart contract, wherein each section of the plurality of sections of selected template includes programming code that implements a compliance scheme to different terms or conditions related to each respective section of the finalized smart contract.

13. The non-transitory computer readable medium of claim 12, further embodied with the programming code that when executed causes the processor to:

prior to assembling all the sections of the selected template, receive an updated section of the one or more sections from the contract-creating device, wherein the updated section includes a revision to the inputted specific contract terms in the fillable field of the updated section or a specific section-related contractual terms; and replace an identical section of selected template with the updated section for assembling.

14. The non-transitory computer readable medium of claim 11, further embodied with the programming code that when executed causes the processor to:

execute a portion of the finalized smart contract, wherein the executed portion indicates acceptance of the terms and conditions including the specific contract terms.

15. The non-transitory computer readable medium of claim 11, further embodied with the programming code that when executed causes the processor to:

receive an indication that the selected template of the smart contract is related to one of: an automobile purchase, an automobile lease, a personal loan, a business loan, a rental agreement, a will, a trust agreement, or an insurance agreement; and access a data storage containing the selected template identified by the received indication, wherein the selected template includes programming code for implementing the smart contract based on the selected template.

16. The non-transitory computer readable medium of claim 11, further embodied with the programming code that when executed causes the processor to:

send a message related to the finalized smart contract for delivery to a contract participating device;

receive, from the contract participating device, a contract participating hash value indicating a further executed portion was executed by a second party associated with the second party contract participating device; and store the contract participating hash value as a subsequent transaction in the private blockchain, wherein the subsequent transaction is associated with the contract participating hash value, another smart contract address in the private blockchain, and the first user address in the private blockchain.

17. The non-transitory computer readable medium of claim 16, further embodied with the programming code that when executed causes the processor to:

receiving authentication information from the second party contract participating device;

authenticating the second party contract participating device based on the received authentication information; and providing access to a secure collaborative environment within a network environment to the second party contract participating device, wherein the secure collaborative environment within the network environment enables collaborative revision of one or more sections of the finalized smart contract.

18. The non-transitory computer readable medium of claim 17, further embodied with the programming code that when executed causes the processor to:

receive a notification of a revision to the one or more sections of the smart contract within the collaborative environment.

19. The non-transitory computer readable medium of claim 11, further embodied with programming code that when executed causes the processor to:

receive an indication of execution of a portion of the smart contract, wherein the executed portion indicates acceptance of contractual terms and conditions in the finalized smart contract.

20. The non-transitory computer readable medium of claim 11, wherein the revision-related transaction is an initial transaction stored in the private blockchain prior to storing the smart contract hash value.

* * * * *